United States Patent
Honda et al.

(10) Patent No.: US 9,488,461 B2
(45) Date of Patent: Nov. 8, 2016

(54) ROTATION ANGLE DETECTION DEVICE

(71) Applicant: DENSO CORPORATION, Kariya, Aichi-pref. (JP)

(72) Inventors: Hitomi Honda, Kariya (JP); Akitoshi Mizutani, Okazaki (JP); Yoshiyuki Kono, Obu (JP)

(73) Assignee: DENSO CORPORATION, Kariya (JP)

( * ) Notice: Subject to any disclaimer, the term of this patent is extended or adjusted under 35 U.S.C. 154(b) by 110 days.

(21) Appl. No.: 13/904,409

(22) Filed: May 29, 2013

(65) Prior Publication Data

US 2013/0320967 A1    Dec. 5, 2013

(30) Foreign Application Priority Data

May 30, 2012    (JP) .................... 2012-122971

(51) Int. Cl.
  *G01B 7/30* (2006.01)
  *G01D 5/14* (2006.01)
(52) U.S. Cl.
  CPC .............. *G01B 7/30* (2013.01); *G01D 5/145* (2013.01)
(58) Field of Classification Search
  USPC ............ 324/207.2, 200, 207.11–207.25; 702/151, 150, 154; 252/62.51 R; 318/609; 73/114.26
  See application file for complete search history.

(56) References Cited

U.S. PATENT DOCUMENTS 6,160,395 A    12/2000    Goetz et al.
6,509,734 B1 *   1/2003    Luetzow ............... G01D 5/145
                                                                324/207.12
(Continued)

FOREIGN PATENT DOCUMENTS

| JP | 2002-31505 | 1/2002 |
| JP | 2007-040722 | 2/2007 |
| JP | 2007-085942 | 4/2007 |
| JP | 2008-064737 | 3/2008 |
| JP | 2008-141063 | 6/2008 |

OTHER PUBLICATIONS

Office Action (2 pages) dated Jan. 5, 2015, issued in corresponding Japanese Application No. 2012-122971 and English translation (2 pages).

(Continued)

*Primary Examiner* — Melissa Koval
*Assistant Examiner* — Nasima Monsur
(74) *Attorney, Agent, or Firm* — Nixon & Vanderhye P.C.

(57) ABSTRACT

A rotation angle detection device includes a magnetic field generation section, a yoke, and a magnetism detection section. The magnetic field generation section has a first end portion and a second end portion. The yoke has such a tube shape that the magnetic field generation section and a rotation axis of a rotating body are located therein. The yoke has a gap at a part in a circumferential direction in a cross section perpendicular to the rotation axis. The magnetism detection section is disposed in the gap and outputs an electrical signal in accordance with a magnetic field strength in the gap. The magnetic field generation section is disposed in such a manner that a magnetic force line passing through the magnetic field generation section passes through the rotation axis regardless of the rotation angle of the rotating body and the rotation axis passes through the first end portion.

14 Claims, 15 Drawing Sheets

(56) References Cited

U.S. PATENT DOCUMENTS

| | | | |
|---|---|---|---|
| 6,646,435 B1* | 11/2003 | Nakamura et al. | 324/207.25 |
| 7,161,349 B2* | 1/2007 | Itoh et al. | 324/207.25 |
| 2002/0179825 A1* | 12/2002 | Lin | G01D 5/145 250/231.14 |
| 2005/0127903 A1* | 6/2005 | Sogge | G01D 5/145 324/207.2 |
| 2005/0162157 A1* | 7/2005 | Kamizino | G01D 5/145 324/207.25 |
| 2010/0060268 A1* | 3/2010 | Tokunaga | G01D 5/145 324/207.2 |
| 2010/0176803 A1* | 7/2010 | Ausserlechner | G01D 5/145 324/207.25 |
| 2011/0238367 A1* | 9/2011 | Matsumoto et al. | 702/151 |
| 2011/0301913 A1* | 12/2011 | Matsumoto | G01D 5/145 702/151 |

OTHER PUBLICATIONS

Office Action (3 pages) dated May 20, 2014, issued in corresponding Japanese Application No. 2012-122971 and English translation (4 pages).

Decision to Decline Amendment issued in corresponding Japanese Patent Application No. 2012-122971 dated Aug. 5, 2015 (with English-language translation).

Decision of Refusal issued in corresponding Japanese Patent Application No. 2012-122971 dated Aug. 5, 2015 (with English-language translation).

* cited by examiner

US 9,488,461 B2

ROTATION ANGLE DETECTION DEVICE

CROSS REFERENCE TO RELATED APPLICATIONS

The present application is based on and claims priority to Japanese Patent Application No. 2012-122971 filed on May 30, 2012, the contents of which are incorporated in their entirety herein by reference.

TECHNICAL FIELD

The present disclosure relates to a rotation angle detection device.

BACKGROUND

A conventional rotation angle detection device includes a magnetic field generation section that rotates integrally with a rotating body, two yoke pieces that surround the magnetic field generation section, and two magnetic detection sections disposed between the two yoke pieces. The rotation angle detection device detects a rotation angle of the rotating body based on an output signal of the magnetic detection section which changes in accordance with a rotation of the rotating body. JP-A-2002-31505 discloses a rotation angle detection device in which a magnet as a magnetic field generation section is fixed in a groove of an end portion of a rotating shaft, and two Hall elements as magnetic detection sections are disposed in gaps between end portions of two yoke pieces formed by dividing a cylindrical member into halves.

Because the rotation angle detection device disclosed in JP-A-2002-31505 needs two yoke pieces and two Hall elements, the number of components is large and positional relationships among components are likely to vary. Thus, detection angles are likely to vary among individuals. Furthermore, because all the components are required regardless of a detection range, it is difficult to reduce a size of the rotation angle detection device.

SUMMARY

An object of the present disclosure is to provide a rotation angle detection device that can restrict variation in detection angle among individuals and can reduce a size.

A rotation angle detection device according to an aspect of the present disclosure includes a magnetic field generation section, a yoke, and a magnetism detection section. The magnetic field generation section is fixed to one of a rotating body and a supporting member. The magnetic field generation section has a first end portion at which one of magnetic poles is located and a second end portion at which the other of magnetic poles is located. The yoke is made of magnetic material. The yoke has such a tube shape that the magnetic field generation section and a rotation axis of the rotating body are located therein. The yoke has a gap at a part in a circumferential direction in a cross section perpendicular to the rotation axis. The yoke is fixed to the other of the rotating body and the supporting member. The magnetism detection section is disposed in the gap. The magnetism detection section outputs an electrical signal in accordance with a magnetic field strength in the gap which changes with a rotation of the rotating body. The magnetic field generation section is disposed in such a manner that a magnetic force line passing through the magnetic field generation section passes through the rotation axis regardless of the rotation angle of the rotating body and the rotation axis passes through the first end portion of the magnetic field generation section. The yoke surrounds a rotation angle range of the magnetic field generation section.

Because the rotation angle detection device can be manufactured by using one magnetic field generation section and one yoke, the number of components can be small, and positional relationships among components are less likely to vary in an assembling process. Thus, variation in detection angle among individuals can be restricted.

Furthermore, because a size of yoke is reduced in accordance with the rotation angle range of the magnetic field generation section, a size of the rotation angle detection device can be reduced.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Figure 1:
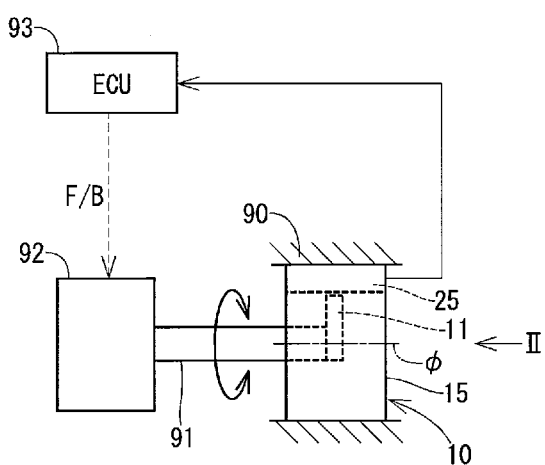
FIG. 1 is a diagram showing a rotation system that includes a rotation angle detection device according to a first embodiment of the present disclosure.

Embodiments of the present disclosure will be described with reference to accompanying drawings. Among the embodiments, components having substantially similar configurations are designated by the same reference numerals, and a description about the components will be omitted.

First Embodiment

A rotation angle detection device according to a first embodiment of the present disclosure can be applied to a rotating part, such as an electronic throttle, an exhaust gas recirculation valve, or an acceleration pedal of a vehicle. A rotation system shown in FIG. 1 includes a housing 90, a rotating shaft 91 which is rotatably supported, a rotary actuator 92 which is capable of rotating the rotating shaft 91, and a rotation angle detection device 10. The housing 90 is an example of a supporting member, and the rotating shaft 91 is an example of a rotating part. The rotation angle detection device 10 detects a rotation angle of the rotating shaft 91 with respect to the housing 90. The rotation angle detection device 10 transmits an electrical signal indicating the detected rotation angle to an electronic control unit (ECU) 93. The ECU 93 performs a feedback control of the rotary actuator 92 based on the electrical signal transmitted from the rotation angle detection device 10.

A configuration of the rotation angle detection device 10 will be described with reference to FIG. 1, FIG. 2, FIG. 3, and FIG. 4. The rotation angle detection device 10 includes a permanent magnet 11, a yoke 15, and a Hall IC 25 including a Hall element 26. The permanent magnet 11 is an example of a magnetic field generation section, and the Hall element 26 is an example of a magnetism detection section.

The permanent magnet 11 has a rod shape extending in a direction perpendicular to a rotation axis $\phi$ of the rotating shaft 91. The permanent magnet 11 has a first end portion 12 at which the south pole is located and a second end portion 13 at which the north pole is located. The permanent magnet 11 is disposed in such a manner that the rotation axis $\phi$ passes through the first end portion 12 and is fixed to an end portion of the rotating shaft 91. The permanent magnet 11 is rotatable integrally with the rotating shaft 91 around the first end portion 12.

Figure 2:
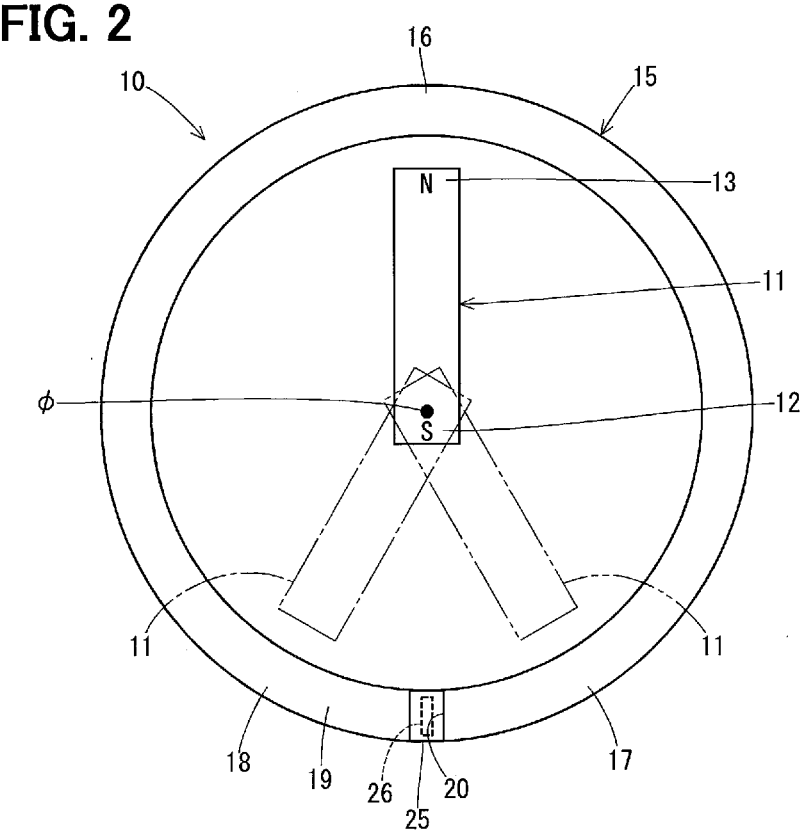
FIG. 2 is a diagram showing the rotation angle detection device viewed in a direction shown by the arrow II in FIG. 1.

Magnetic field lines passing through the permanent magnet 11 pass through the rotation axis $\phi$ regardless of the rotation angle of the rotating shaft 91. In FIG. 2, a position of the permanent magnet 11 shown by a solid line in FIG. 2 is set as a reference position, a position shown by a dashed-dotted line is set as a maximum rotation position on the minus side, and a position shown by dashed-two dotted line is set as a maximum rotation position on the plus side. The magnetic field lines passing through the permanent magnet 11 pass through the rotation axis $\phi$ at all positions from the maximum rotation angle on the minus side to the maximum rotation angle on the plus side. Hereafter, a range where the permanent magnet 11 moves when the permanent magnet 11 rotates from the maximum rotation angle on the minus side to the maximum rotation angle on the plus side is referred to as a rotation angle range. In the first embodiment, the rotation angle range of the permanent magnet 11 is ±150 degrees around the rotation axis $\phi$ from the reference position. In other words, the rotation angle range of the permanent magnet 11 is a sector shape whose center angle is 300 degrees. The rotation angle range corresponds to a detection range of the rotation angle detection device 10.

The yoke 15 is made of magnetic material. The yoke 15 has such a circular tube shape that the permanent magnet 11 and the rotation axis $\phi$ are located therein. The yoke 15 has a first wall 16 and a second wall 19. The first wall 16 faces the second end portion 13 of the permanent magnet 11 regardless of the rotation angle of the rotating shaft 91. The second wall 19 connects end portions 17, 18 of the first wall 16 in a cross section perpendicular to the rotation axis $\phi$. In the first embodiment, the yoke 15 has the circular tube shape surrounding the rotation angle range of the permanent magnet 11. The yoke 15 is disposed in such a manner that an axial direction of the yoke 15 corresponds to the rotation axis $\phi$ and is fixed to an inner wall of the housing 90.

A distance between the first wall 16 and the second end portion 13 of the permanent magnet 11 is fixed regardless of the rotation angle of the rotating shaft 91. The second wall 19 has a gap 20 at a center portion in a circumferential direction in the cross section perpendicular to the rotation axis $\phi$. When the permanent magnet 11 is located at the reference position, the gap 20 is located on an opposite side of rotation axis $\phi$ from the second end portion 13 and is located on a straight line passing through the second end portion 13 and the first end portion 12. When the permanent magnet 11 is located at the reference position, the yoke 15 has a line symmetric shape with respect to the straight line passing through the second end portion 13, the first end portion 12, and the gap 20 in the cross section perpendicular to the rotation axis $\phi$.

Figure 3:
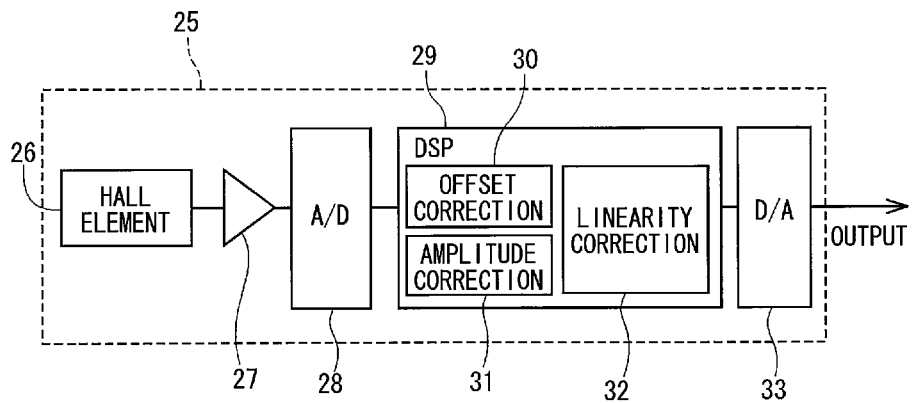
FIG. 3 is a block diagram showing a Hall IC.

The Hall IC 25 is disposed in the gap 20 of the yoke 15. As shown in FIG. 3, the Hall IC 25 includes the Hall element 26, an amplifier circuit 27, an ND conversion circuit 28, a signal processor 29, and a D/A conversion circuit 33. The Hall element 26 is a magnetoelectric conversion element that uses the Hall effect. The Hall element 26 outputs an analog electrical signal in accordance with a magnetic flux of a magnetism sensing surface. The magnetism sensing surface is a surface perpendicular to the circumferential direction of the yoke 15. The amplifier circuit 27 amplifies the analog electrical signal outputted from the Hall element 26. The A/D conversion circuit 28 converts the analog electrical signal amplified by the amplifier circuit 27 into a digital electrical signal. The signal processor 29 performs various processes to the digital electrical signal outputted from the A/D conversion circuit 28. For example, the signal processor 29 includes a digital signal processor (DSP). The signal processor 29 includes an offset correction circuit 30, an amplitude correction circuit 31, and a linearity correction circuit 32. The linearity correction circuit 32 linearizes the output signal of the Hall element 26 with respect to the rotation angle. The D/A conversion circuit 33 converts the digital electrical signal outputted from the signal processor 29 to an analog electrical signal.

Figure 4:
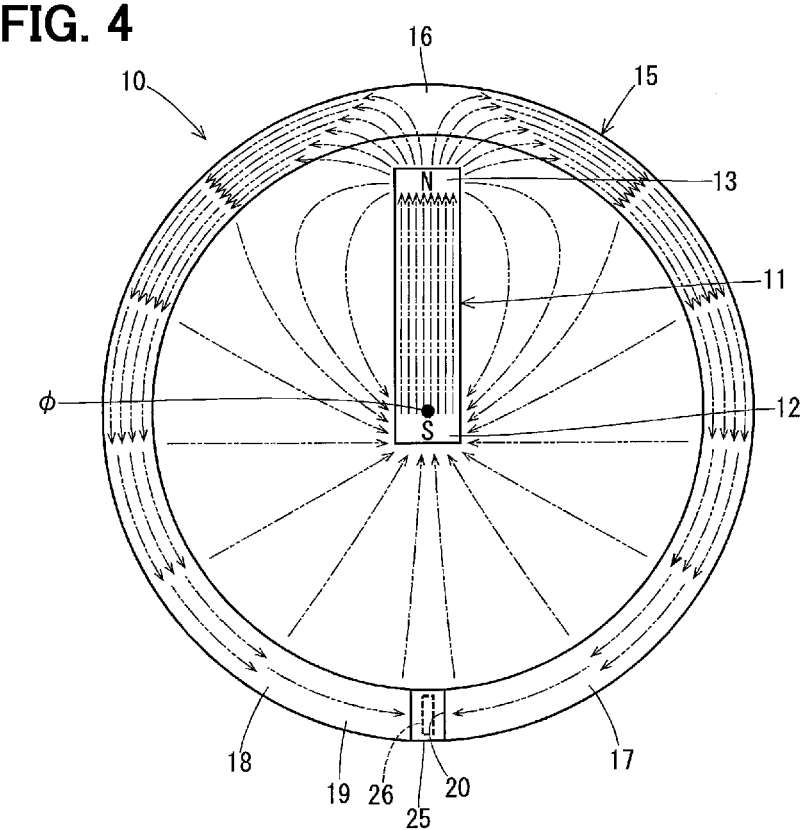
FIG. 4 is a diagram showing magnetic field lines passing through a yoke in the rotation angle detection device.
Figure 5:
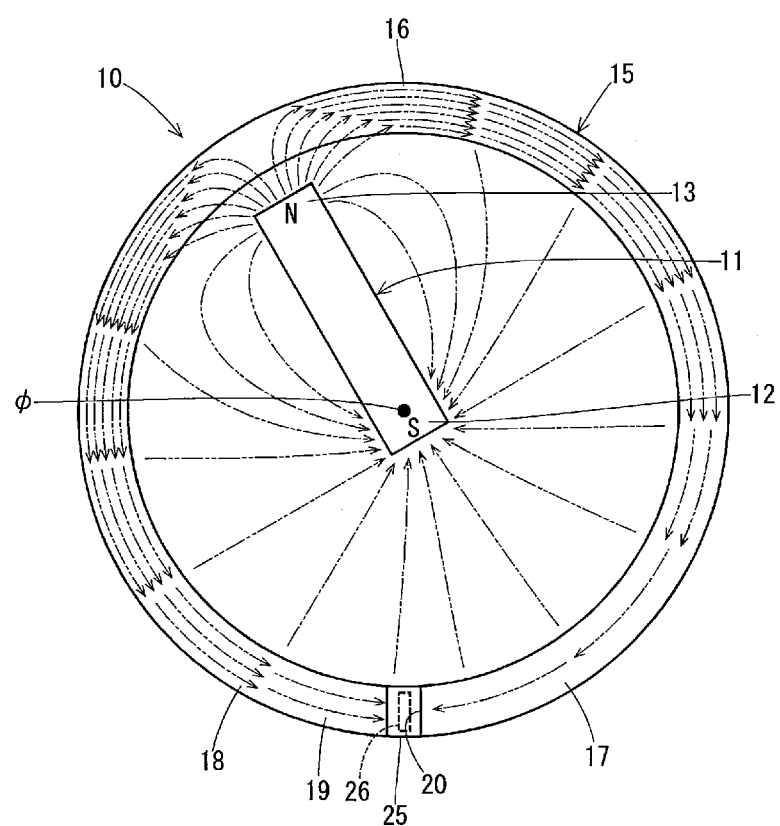
FIG. 5 is a diagram showing a state of the rotation angle detection device in which a permanent magnet rotates 30 degrees in a counterclockwise direction from a state shown in FIG. 4.
Figure 6:
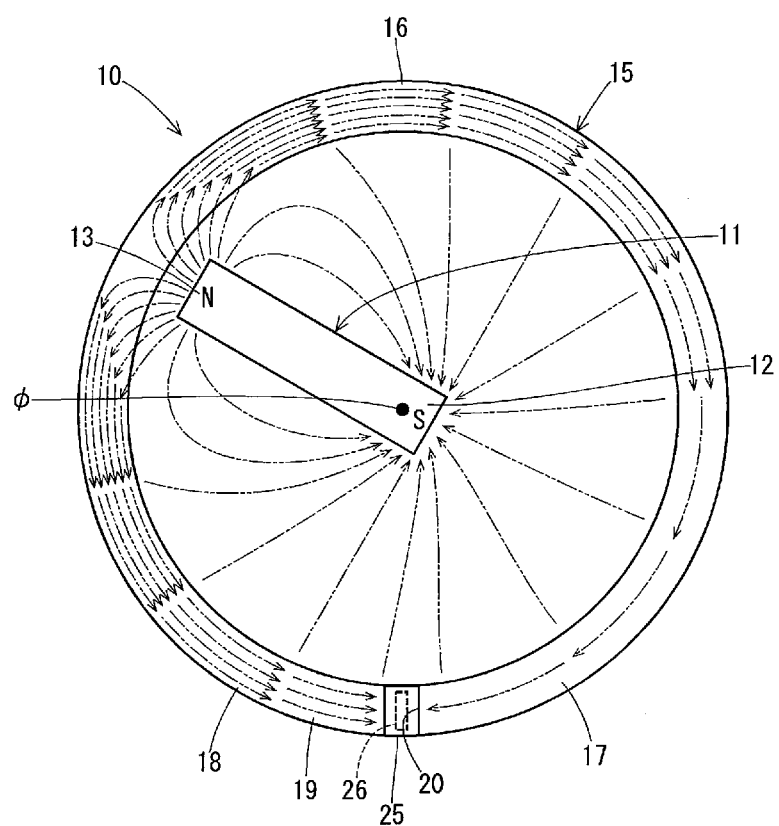
FIG. 6 is a diagram showing a state of the rotation angle detection device in which the permanent magnet rotates 60 degrees in the counterclockwise direction from the state shown in FIG. 4.
Figure 7:
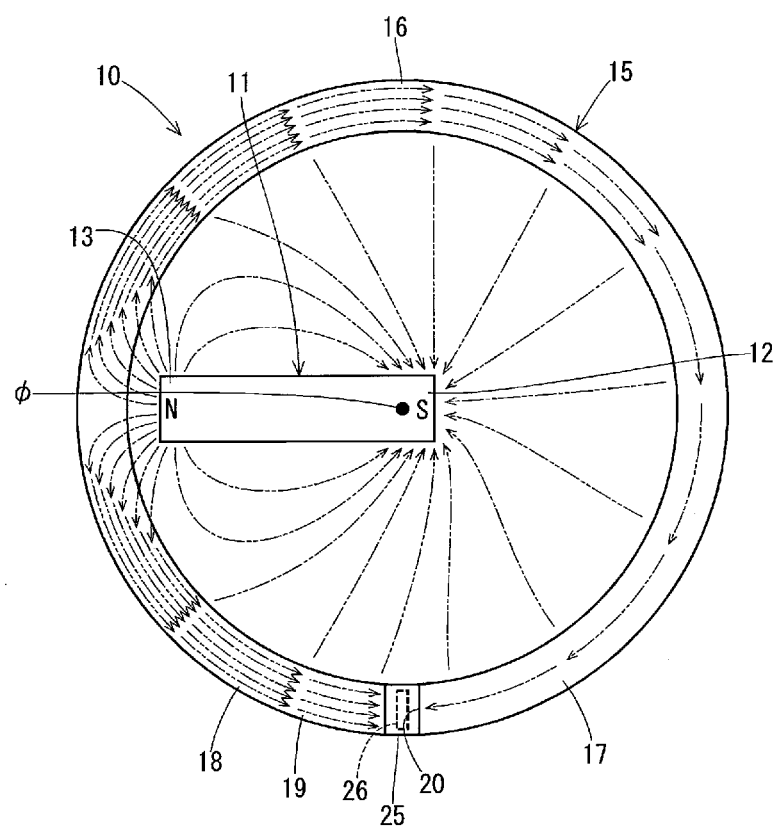
FIG. 7 is a diagram showing a state of the rotation angle detection device in which the permanent magnet rotates 90 degrees in the counterclockwise direction from the state shown in FIG. 4.
Figure 8:
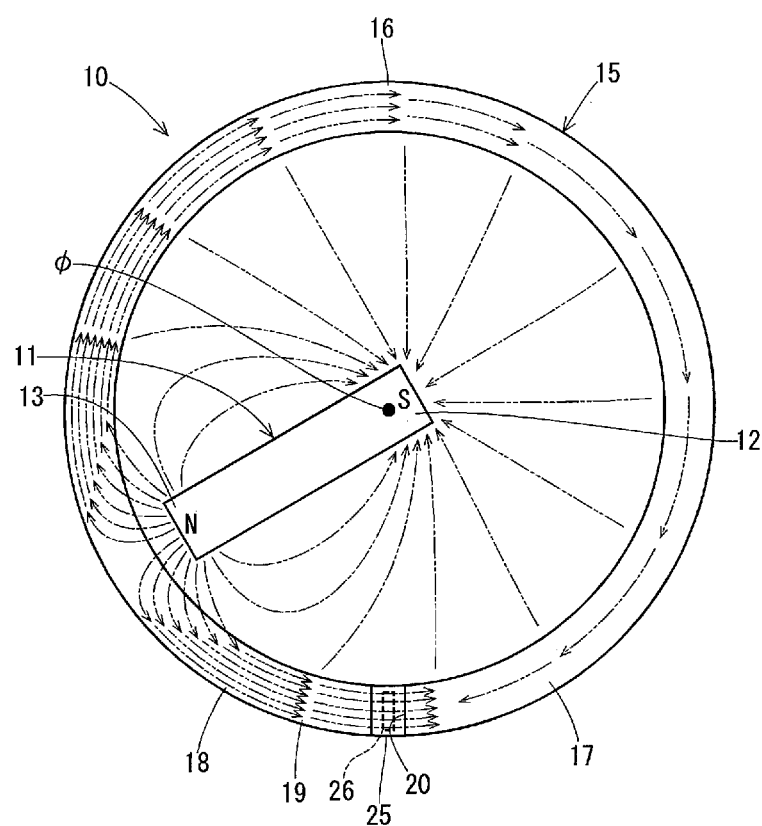
FIG. 8 is a diagram showing a state of the rotation angle detection device in which the permanent magnet rotates 120 degrees in the counterclockwise direction from the state shown in FIG. 4.
Figure 9:
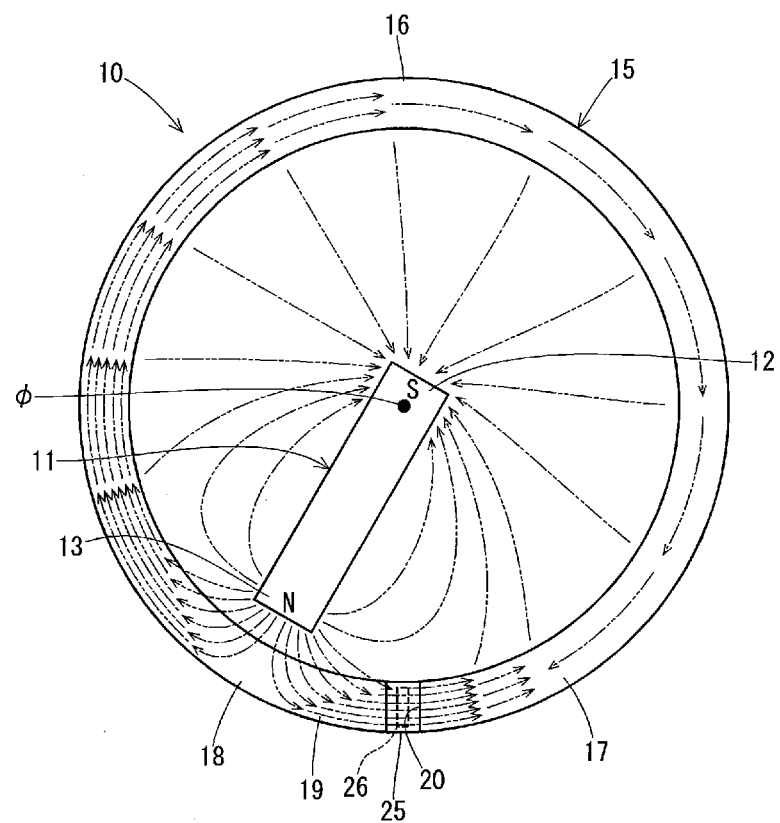
FIG. 9 is a diagram showing a state of the rotation angle detection device in which the permanent magnet rotates 150 degrees in the counterclockwise direction from the state shown in FIG. 4.
Figure 10:
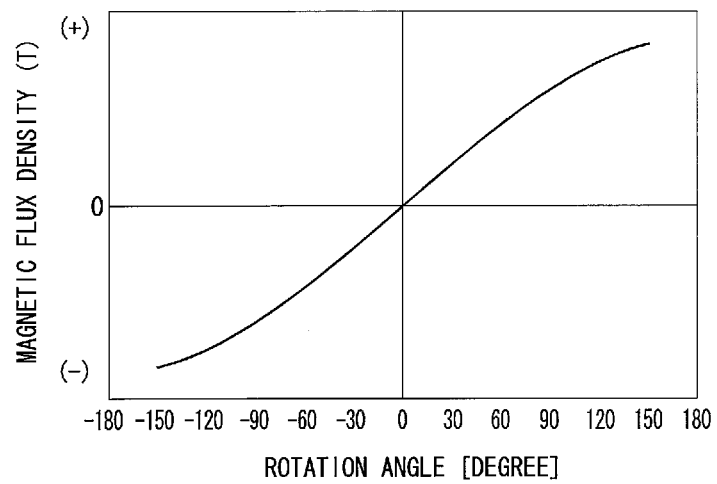
FIG. 10 is a characteristic diagram of a magnetic flux density detected by a Hall element shown in FIG. 3.

Next, an operation of the rotation angle detection device 10 will be described with reference to FIG. 4 to FIG. 11. The magnetic force lines passing through the permanent magnet 11, which are shown by the dashed-two dotted lines, are not illustrated in FIG. 5 to FIG. 8. As shown in FIG. 4, when the permanent magnet 11 is located at the reference position, the magnetic force lines that pass through the end portion 17 of the yoke 15 and enter the magnetism sensing surface of the Hall element 26 have the opposite direction and the same amount compared with the magnetic force lines that pass through the end portion 18 of the yoke 15 and enter the magnetism sensing surface of the Hall element 26. Thus, when the rotation angle of the rotating shaft 91 corresponding to the reference position of the permanent magnet 11 is regarded as 0 degrees, as shown in FIG. 10, when the rotation angle of the rotating shaft 91 is 0 degrees, a magnetic field strength, that is, the magnetic flux density in the gap 20 detected by the Hall element 26 is 0 mT.

When the permanent magnet 11 rotates from the reference position toward the end portion 18 in association with the rotating shaft 91, the amount of the magnetic force lines that pass through the end portion 18 of the yoke 15 and enter the magnetism sensing surface of the Hall element 26 becomes larger than the amount of the magnetic force lines that pass through the end portion 17 of the yoke 15 and enter the magnetism sensing surface of the Hall element 26. For example, when the permanent magnet 11 rotates from the reference position to the maximum rotation position on the minus side, the permanent magnet 11 moves as shown in FIG. 4, FIG. 5, FIG. 6, FIG. 7, FIG. 8, and FIG. 9 in this order. As the second end portion 13 of the permanent magnet 11 approaches the end portion 18, the amount of the magnetic force lines that pass through the end portion 18 and enter the magnetism sensing surface of the Hall element 26 increases, and the amount of the magnetic force lines that pass through the end portion 17 and enter the magnetism sensing surface of the Hall element 26 decreases. Thus, when the rotation angle of the rotating shaft 91 corresponding to the maximum rotation position on the minus side of the permanent magnet 11 is set as −150 degrees, as shown in FIG. 10, the magnetic flux B detected by the Hall element 26 increases to the minus side as the rotation angle of the rotating shaft 91 approaches −150 degrees.

When the permanent magnet 11 rotates from the reference position toward the end portion 17 in association with the rotating shaft 91, the amount of the magnetic force lines that pass through the end portion 18 of the yoke 15 and enter the magnetism sensing surface of the Hall element 26 becomes smaller than the amount of the magnetic force lines that pass through the end portion 17 of the yoke 15 and enter the magnetism sensing surface of the Hall element 26. As the second end portion 13 of the permanent magnet 11 approaches the end portion 17, the amount of the magnetic force lines that pass through the end portion 18 and enter the magnetism sensing surface of the Hall element 26 decreases, and the amount of the magnetic force lines that pass through the end portion 17 and enter the magnetism sensing surface of the Hall element 26 increases. Thus, when the rotation angle of the rotating shaft 91 corresponding to the maximum rotation position on the plus side of the permanent magnet 11 is set as 150 degrees, as shown in FIG. 10, the magnetic flux B detected by the Hall element 26 increases to the plus side as the rotation angle of the rotating shaft 91 approaches 150 degrees.

Figure 11:
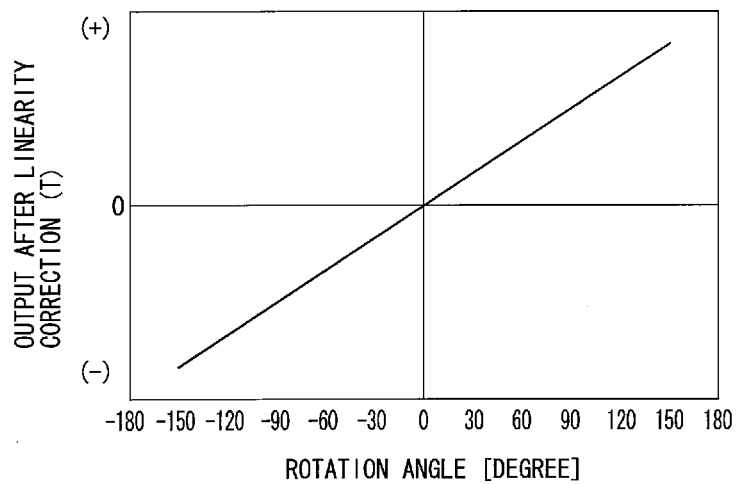
FIG. 11 is a characteristic diagram of an electrical signal output from the Hall IC shown in FIG. 3.

As described above, the Hall element 26 outputs the analog electrical signal in accordance with the magnetic field strength in the gap 20 that changes with the rotation of the rotating shaft 91. The Hall IC 25 converts the analog electrical signal output from the Hall element 26 into the digital electrical signal, performs various corrections including the linearity correction to the digital electrical signal, and then converts the digital electrical signal to the analog electrical signal. FIG. 11 is a characteristic diagram of the electrical signal outputted from the Hall IC.

As described above, the rotation angle detection device 10 according to the first embodiment includes the permanent magnet 11, the yoke 15, and the Hall element 26. The permanent magnet 11 is fixed to the rotating shaft 91. The yoke 15 has such a circular tube shape that the permanent magnet 11 and the rotation axis φ are located therein. The Hall element 26 is disposed in the gap 20 of the yoke 15 and outputs the electrical signal in accordance with the magnetic field strength of the gap 20 which changes with the rotation of the rotating shaft 91. Because the rotation angle detection device 10 can be manufactured by using one permanent magnet 11 and one yoke 15, the number of components can be small, and the positional relationship among components are less likely to vary in an assembling process. Thus, variation in detection angle among different individuals can be restricted.

In the first embodiment, the permanent magnet 11 is fixed to the rotating shaft 91 and integrally rotates with the rotating shaft 91 around the first end portion 12. Because the permanent magnet 11 smaller than the yoke 15 is fixed to the rotating shaft 91, the rotation of the rotating shaft 91 is less likely to be disturbed compared with a case where the yoke 15 is fixed to the rotating shaft 91.

In the first embodiment, the yoke 15 includes the first wall 16 and the second wall 19. The first wall 16 faces the second end portion 13 of the permanent magnet 11 regardless of the rotation angle of the rotating shaft 91. The second wall 19 connects the end portions 17, 18 of the first wall 16. The distance between the second end portion 13 of the permanent magnet 11 and the first wall 16 is fixed regardless of the rotation angle of the rotating shaft 91. Thus, the amount of the magnetic force lines that enter from the permanent magnet 11 into the first wall 16 can be fixed regardless of the rotation angle, and an output characteristic of the Hall element 26 can be stabilized. Furthermore, because the yoke 15 has the circular tube shape, the detection range can be 300 degrees.

In addition, in the first embodiment, the second wall 19 has the gap 20 at the center portion in the longitudinal direction in the cross section perpendicular to the rotation axis φ. The Hall element 26 is disposed in the gap 20 of the second wall 19. When the permanent magnet 11 is located at the reference position, the yoke 15 has the line symmetric shape with respect to the straight line passing through the second end portion 13, the first end portion 12, and the gap 20 in the cross section perpendicular to the rotation axis φ. Thus, when the permanent magnet 11 is located at the reference position, the amount of the magnetic force lines that enter the magnetism sensing surface can be the same in one direction and the other direction in the circumferential direction. In other words, when the permanent magnet 11 is located at the reference position, the magnetic flux density B detected by the Hall element 26 can be 0 mT.

Second Embodiment

Figure 12:
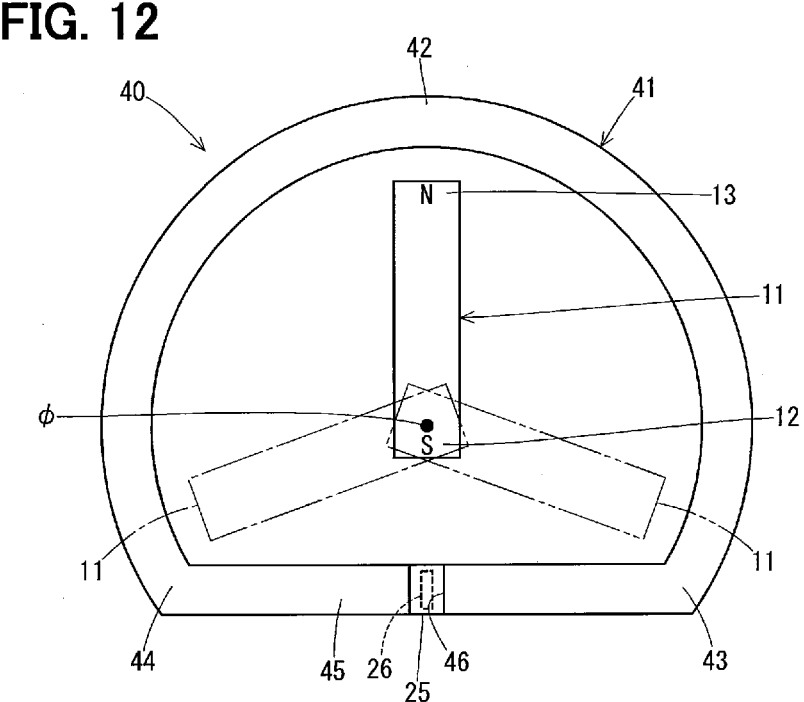
FIG. 12 is a diagram showing a rotation angle detection device according to a second embodiment of the present disclosure.
Figure 13:
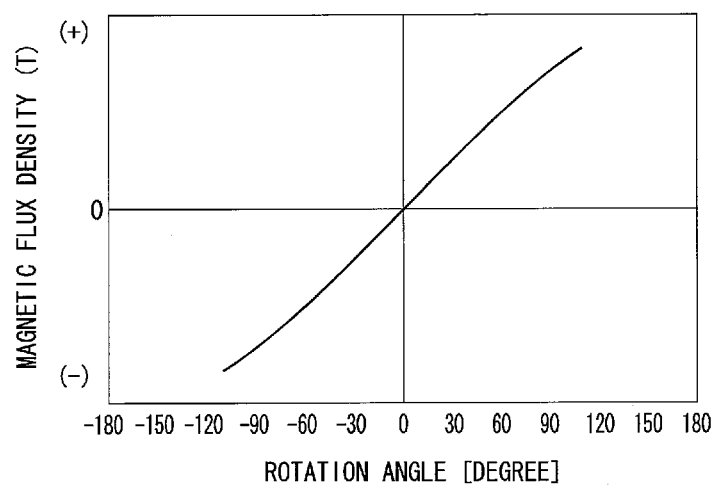
FIG. 13 is a characteristic diagram of a magnetic flux density detected by a Hall element shown in FIG. 12.

A rotation angle detection device 40 according to a second embodiment of the present disclosure will be described with reference to FIG. 12 and FIG. 13. A detection range of the rotation angle detection device 40 is ±110 degrees around the rotation axis φ from the reference position. The permanent magnet 11 is capable of rotating from a maximum rotation position on a minus side, which is shown by a dashed dotted line in FIG. 12 and corresponds to −110 degrees, to a maximum rotation position on a plus side, which is shown by a dashed-two dotted line in FIG. 12 and corresponds to +110 degrees. In the present embodiment, the rotation angle range of the permanent magnet 11 is a sector shape whose center angle is 220 degrees.

The rotation angle detection device 40 includes a yoke 41. The yoke 41 includes a first wall 42 and a second wall 45 and has a tube shape surrounding the rotation angle range of the permanent magnet 11. In a cross section perpendicular to the rotation axis φ, the first wall 42 has such an arc shape that a center of curvature corresponds to the rotation axis φ. In the cross section perpendicular to the rotation axis φ, the second wall 45 has a linear shape connecting end portions 43, 44 of the first wall 42. The second wall 45 has a gap 46 at a center portion in a longitudinal direction. When the permanent magnet 11 is located at the reference position, the yoke 41 has the line symmetric shape with respect to a straight line passing through the second end portion 13, the first end portion 12, and the gap 46 in the cross section perpendicular to the rotation axis φ.

The Hall element 26 outputs an analog electrical signal in accordance with a magnetic field strength in the gap 46 that changes with the rotation of the rotating shaft 91. FIG. 13 is a characteristic diagram showing an output characteristic of the Hall element 26 according to the second embodiment. According to the second embodiment, effects similar to the effects of the first embodiment can be obtained. Furthermore, according to the second embodiment, because the rotation angle range of the permanent magnet 11 is smaller than the first embodiment and a size of the yoke 41 is reduced in accordance with the rotation angle range, a size of the rotation angle detection device 40 can be reduced.

Third Embodiment

Figure 14:
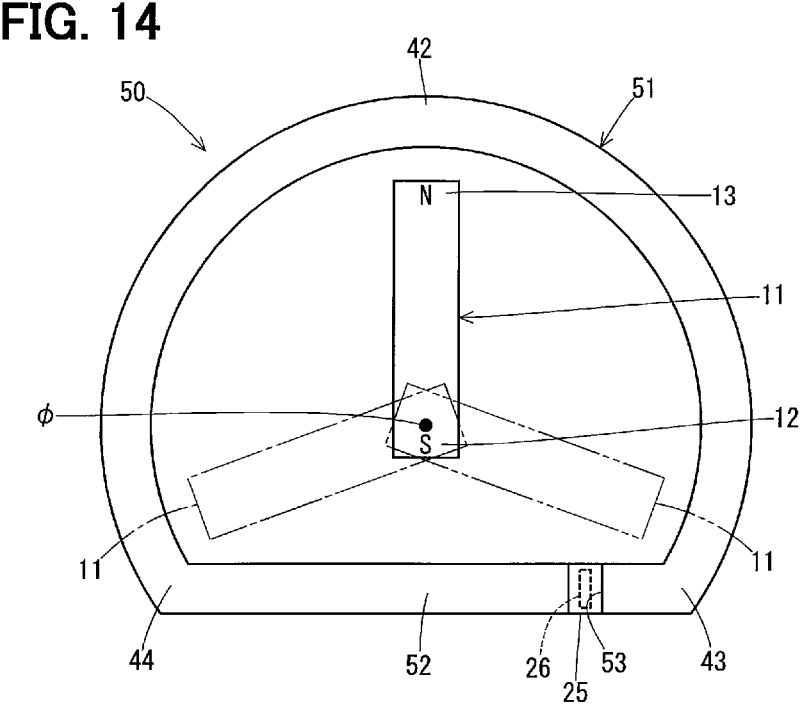
FIG. 14 is a diagram showing a rotation angle detection device according to a third embodiment of the present disclosure.
Figure 15:
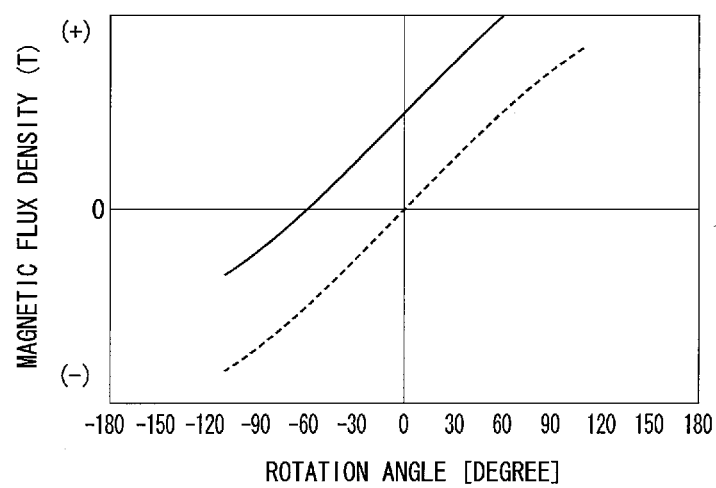
FIG. 15 is a characteristic diagram of a magnetic flux density detected by a Hall element shown in FIG. 14.

A rotation angle detection device 50 according to a third embodiment of the present disclosure will be described with reference to FIG. 14 and FIG. 15. The rotation angle detection device 50 includes a yoke 51. The yoke 51 includes the first wall 42 and a second wall 52. The second wall 52 has a gap 53 at a position shifted toward the end portion 44 from a center portion in a longitudinal direction in a cross section perpendicular to the rotation axis φ. In other words, the gap 53 is provided apart from the center portion in the longitudinal direction of the second wall 52 in the cross section perpendicular to the rotation axis φ. As shown by a solid line in FIG. 15, when the rotation angle of the rotating shaft 91 is +60 degrees, the magnetic flux density detected by the Hall element 26 becomes 0 mT, and a detection error due to a temperature becomes the minimum. Note that a dashed line in FIG. 15 shows the output characteristic of the Hall element 26 according to the first embodiment. As described above, by adjusting the position of the gap 53 as the third embodiment, the detection error due to the temperature can be the minimum at the rotation position where the highest detection accuracy is required, and the detection accuracy can be increased.

Fourth Embodiment

Figure 16:
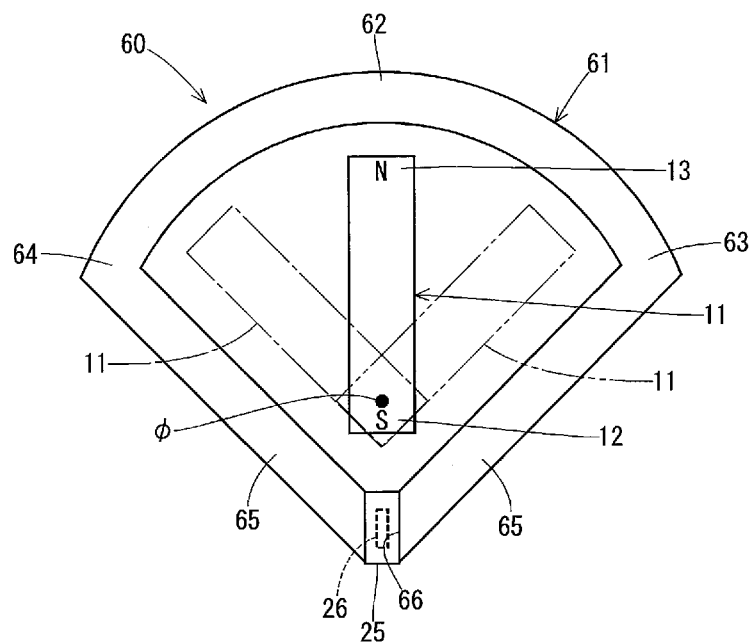
FIG. 16 is a diagram showing a rotation angle detection device according to a fourth embodiment of the present disclosure.
Figure 17:
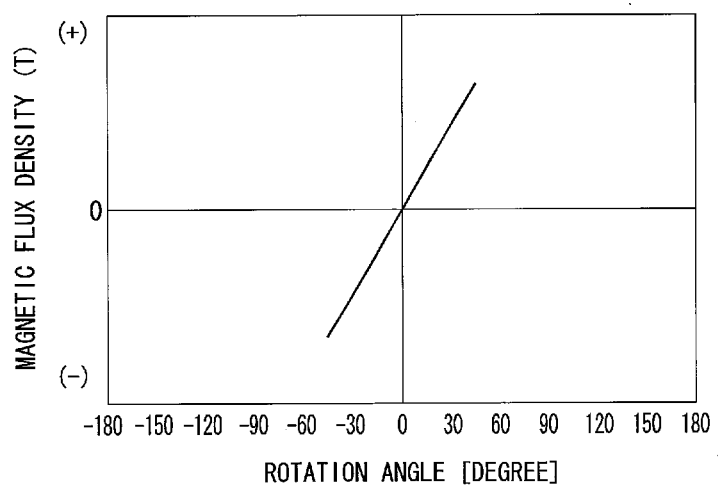
FIG. 17 is a characteristic diagram of a magnetic flux density detected by a Hall element shown in FIG. 16.

A rotation angle detection device 60 according to a fourth embodiment of the present disclosure will be described with reference to FIG. 16 and FIG. 17. A detection range of the rotation angle detection device 60 is ±45 degrees around the rotation axis φ from the reference position. The permanent magnet 11 is capable of rotating from a maximum rotation position on a minus side, which is shown by a dashed dotted line in FIG. 16 and corresponds to −45 degrees, to a maximum rotation position on a plus side, which is shown by a dashed-two dotted line in FIG. 16 and corresponds to +45 degrees. In the present embodiment, the rotation angle range of the permanent magnet 11 is a sector shape whose center angle is 90 degrees.

The rotation angle detection device 40 includes a yoke 61. The yoke 61 includes a first wall 62 and a second wall 65 and has a tube shape surrounding the rotation angle range of the permanent magnet 11. In a cross section perpendicular to the rotation axis φ, the first wall 62 has such an arc shape that a center of curvature corresponds to the rotation axis φ. The second wall 65 includes two linear portions that connect end portions 63, 64 of the first wall 62 and has a gap 66 between the two linear portions. When the permanent magnet 11 is located at the reference position, the yoke 61 has the line symmetric shape with respect to a straight line passing through the second end portion 13, the first end portion 12, and the gap 46 in the cross section perpendicular to the rotation axis φ.

The Hall element 26 outputs an analog electrical signal in accordance with a magnetic field strength in the gap 66 which changes with the rotation of the rotating shaft 91. FIG. 17 is a characteristic diagram showing an output characteristic of the Hall element 26 according to the fourth embodiment. According to the fourth embodiment, effects similar to the effects of the second embodiment can be obtained. Furthermore, according to the fourth embodiment, because the rotation angle range of the permanent magnet 11 is smaller than the second embodiment, and a size of the yoke 61 is reduced in accordance with the rotation angle range, a size of the rotation angle detection device 60 can be reduced.

Fifth Embodiment

Figure 18:
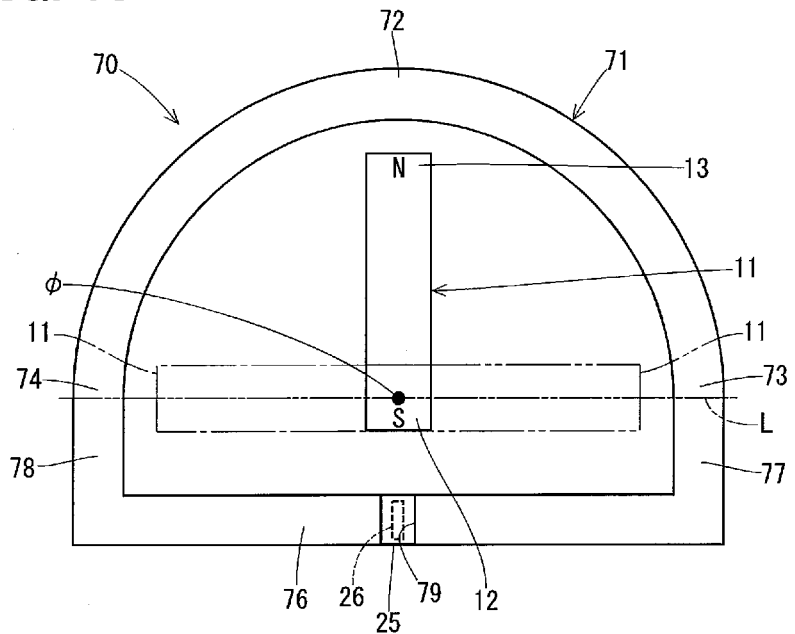
FIG. 18 is a diagram showing a rotation angle detection device according to a fifth embodiment of the present disclosure.
Figure 19:
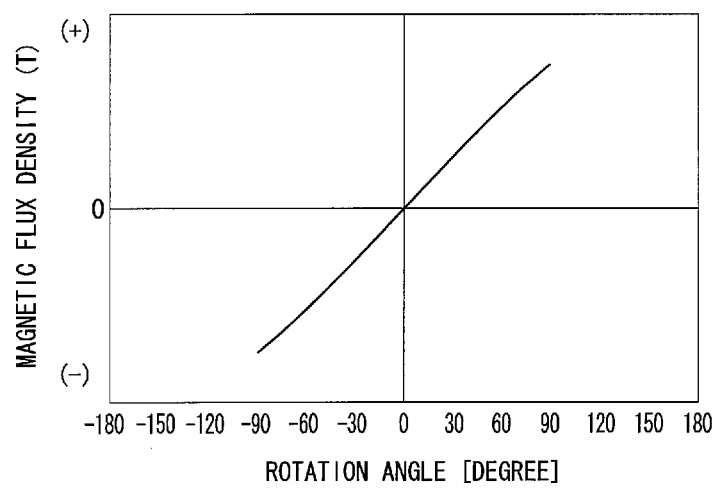
FIG. 19 is a characteristic diagram of a magnetic flux density detected by a Hall element shown in FIG. 18.

A rotation angle detection device 70 according to a fifth embodiment of the present disclosure will be described with reference to FIG. 18 and FIG. 19. A detection range of the rotation angle detection device 70 is ±90 degrees around the rotation axis φ from the reference position. The permanent magnet 11 is capable of rotating from a maximum rotation position on a minus side, which is shown by a dashed dotted line in FIG. 18 and corresponds to −90 degrees, to a maximum rotation position on a plus side, which is shown by a dashed-two dotted line in FIG. 18 and corresponds to +90 degrees. In the fifth embodiment, the rotation angle range of the permanent magnet 11 is a sector shape whose center angle is 180 degrees.

The rotation angle detection device 70 includes a yoke 71. The yoke 71 includes a first wall 72 and a second wall 75 and has a tube shape surrounding the rotation angle range of the permanent magnet 11. In a cross section perpendicular to the rotation axis φ, the first wall 72 has such a semicircle arc shape that a center of curvature corresponds to the rotation axis φ. The second wall 75 includes a first plate portion 76, a second plate portion 77, and a third plate portion 78. The first plate portion 76 is parallel to a virtual line L that passes through end portions 73, 74 of the first wall 72. The second plate portion 77 is perpendicular to the first plate portion 76 and is connected with the end portion 73 of the first wall 72. The third plate portion 78 is perpendicular to the first plate portion 76 and is connected with the end portion 74 of the first wall 72. The first plate portion 76 has a gap 79 at a center portion in a longitudinal direction. When the permanent magnet 11 is located at the reference position, the yoke 71 has the line symmetric shape with respect to a straight line passing through the second end portion 13, the first end portion 12, and the gap 79 in the cross section perpendicular to the rotation axis $\phi$.

The Hall element 26 outputs an analog electrical signal in accordance with a magnetic field strength in the gap 79 which changes with the rotation of the rotating shaft 91. FIG. 19 is a characteristic diagram showing an output characteristic of the Hall element 26 according to the fifth embodiment. According to the fifth embodiment, effects similar to the effects of the third embodiment can be obtained. Furthermore, in the fifth embodiment, the first plate portion 76 of the second wall 75 is apart from the second end portion 13 of the permanent magnet 11 located at the maximum rotation position. Thus, the detection accuracy in the vicinity of the maximum rotation position can be increased, and the detection range can be expanded.

Sixth Embodiment

Figure 20:
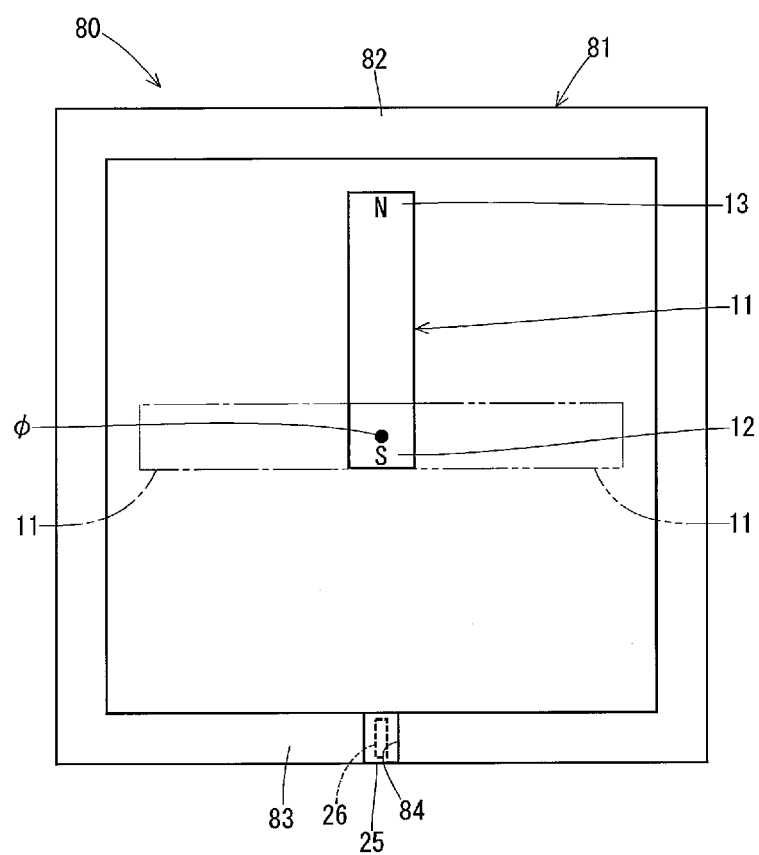
FIG. 20 is a diagram showing a rotation angle detection device according to a sixth embodiment of the present disclosure.
Figure 21:
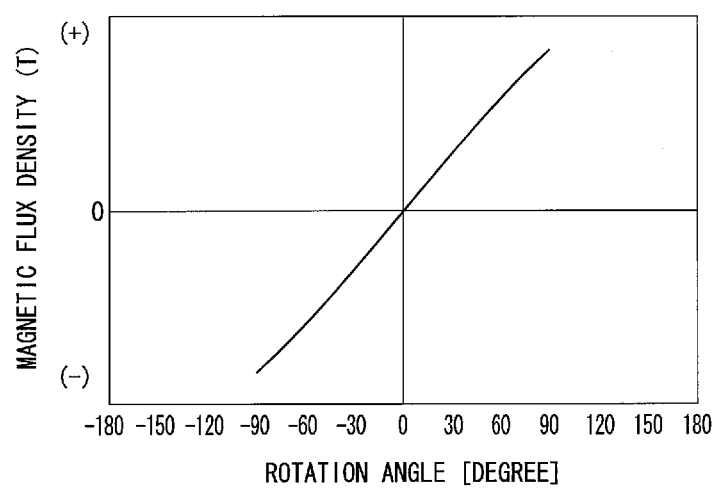
FIG. 21 is a characteristic diagram of a magnetic flux density detected by a Hall element shown in FIG. 20.

A rotation angle detection device 80 according to a sixth embodiment of the present disclosure will be described with reference to FIG. 20 and FIG. 21. A detection range of the rotation angle detection device 80 is ±90 degrees around the rotation axis $\phi$ from the reference position. The permanent magnet 11 is capable of rotating from a maximum rotation position on a minus side, which is shown by a dashed dotted line in FIG. 20 and corresponds to −90 degrees, to a maximum rotation position on a plus side, which is shown by a dashed-two dotted line in FIG. 20 and corresponds to +90 degrees. In the sixth embodiment, the rotation angle range of the permanent magnet 11 is a sector shape whose center angle is 180 degrees.

The rotation angle detection device 80 includes a yoke 81. The yoke 81 includes a first wall 82 and a second wall 83 and has a quadrangular tube shape surrounding the rotation angle range of the permanent magnet 11. The second wall 83 has a gap 84 at a center portion in a longitudinal direction. When the permanent magnet 11 is located at the reference position, the yoke 81 has the line symmetric shape with respect to a straight line passing through the second end portion 13, the first end portion 12, and the gap 84 in the cross section perpendicular to the rotation axis $\phi$.

The Hall element 26 outputs an analog electrical signal in accordance with a magnetic field strength in the gap 84 which changes with the rotation of the rotating shaft 91. FIG. 21 is a characteristic diagram showing an output characteristic of the Hall element 26 according to the sixth embodiment. Because the yoke 81 according to the sixth embodiment has the quadrangular tube shape, the yoke 81 can be easily manufactured compared with the yoke 15 having the circular tube shape, and a manufacturing cost can be reduced.

Seventh Embodiment

Figure 22:
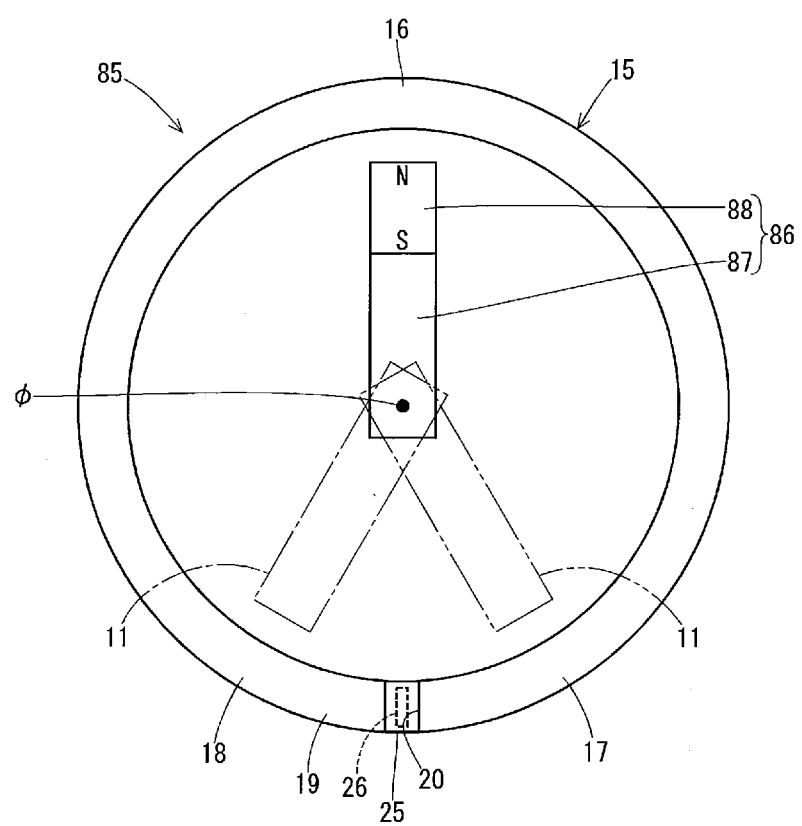
FIG. 22 is a diagram showing a rotation angle detection device according to a sixth embodiment of the present disclosure.

A rotation angle detection device 85 according to a seventh embodiment of the present disclosure will be described with reference to FIG. 22. A detection range of the rotation angle detection device 80 is ±150 degrees around the rotation axis $\phi$ from the reference position. In the seventh embodiment, a rotor 86 is provided instead of the permanent magnet 11 of the first embodiment. The rotor 86 is another example of the magnetic field generation section. The rotor 86 includes a magnetic body 87 and a permanent magnet 88.

The magnetic body 87 extends from the rotation axis $\phi$ in a direction perpendicular to the rotation axis $\phi$. The permanent magnet 88 is fixed to an end surface of the magnetic body 87 facing the first wall 16 of the yoke 15. According to the seventh embodiment, a size of the permanent magnet 88 can be reduced. Thus, a manufacturing cost can be reduced.

Other Embodiments

In another embodiment of the present disclosure, the rotation angle range of the permanent magnet may be an angle range other than ±150 degrees, ±110 degrees, ±90 degrees, and ±45 degrees around the rotation axis $\phi$. In another embodiment, a permanent magnet may be fixed to a housing and a yoke may be fixed to a rotating shaft. In another embodiment, for example, a coil and the like other than the permanent magnet may be used as the magnetic field generation section. In another embodiment, for example, a magnetic resistance element and the like other than the Hall element may be used as the magnetism detection section. In a case where the Hall element is used as the magnetism detection section, a Hall IC including various processing circuit does not have to be provided. In other words, various processes may be performed by an external device, and the rotation angle detection device has to include only the Hall element.

In another embodiment, the rotation angle detection device may be applied to an apparatus other than the vehicle. In the seventh embodiment, the permanent magnet 88 of the rotor 86 is disposed on the end surface of the magnetic body 87. In another embodiment, a permanent magnet may be disposed at a middle portion or a base end portion of a magnetic body.

While the present disclosure has been described with reference to the foregoing embodiments, it is to be understood that the disclosure is not limited to the embodiments and constructions. The present disclosure is intended to cover various modification and equivalent arrangements.

What is claimed is:
1. A rotation angle detection device that detects a rotation angle of a rotating body with respect to a supporting member, comprising:
   a magnetic field generation section fixed to one of the rotating body and the supporting member, the magnetic field generation section having a first end portion at which one of magnetic poles is located and a second end portion at which the other of magnetic poles is located;
   a yoke made of magnetic material, the yoke having such a tube shape that the magnetic field generation section and a rotation axis of the rotating body are located therein, the yoke having two end portions that define a gap at a part in a circumferential direction in a cross section perpendicular to the rotation axis, the yoke being fixed to the other of the rotating body and the supporting member; and
   a magnetism detection section disposed in the gap of the yoke and being sandwiched between the two end portions of the yoke, the magnetism detection section being configured to detect a magnetic field strength in the gap only in the circumferential direction and configured to output an electrical signal in accordance with the magnetic field strength in the circumferential direction in the gap which changes with a rotation of the rotating body, wherein the magnetic field generation section has a rod shape and longitudinally extends in a direction perpendicular to the rotation axis of the rotating body, the magnetic field generation section is disposed in such a manner that all of magnetic force lines passing through the magnetic field generation section pass through the rotation axis at every value of the rotation angle of the rotating body and the rotation axis passes through the first end portion of the magnetic field generation section, the yoke surrounds a rotation angle range of the magnetic field generation section, and when the magnetic field generation section is located at a reference position corresponding to a rotation angle of zero degrees, the gap in which the magnetism detection section is disposed is located on an opposite side of the rotation axis from the second end portion of the magnetic field generation section and is located on a straight line passing through the second end portion of the magnetic field generation section and the first end portion of the magnetic field generation section.

2. The rotation angle detection device according to claim 1, wherein the magnetic field generation section integrally rotates with the rotating body around the first end portion.

3. The rotation angle detection device according to claim 1, wherein the yoke includes a first wall and a second wall, the first wall faces the second end portion of the magnetic field generation section at every value of the rotation angle of the rotating body, the second wall connects end portions of the first wall and has the gap, and a distance between the second end portion of the magnetic field generation section and the first wall is fixed at every value of the rotation angle of the of the rotating body.

4. The rotation angle detection device according to claim 1, wherein the yoke has a circular tube shape.

5. The rotation angle detection device according to claim 3, wherein the rotation angle range of the magnetic field generation section is greater than or equal to 180 degrees around the rotation axis, the first wall has an arc shape in a cross section perpendicular to the rotation axis, and the second wall has a linear shape in the cross section perpendicular to the rotation axis.

6. The rotation angle detection device according to claim 3, wherein the magnetism detection section is disposed at a center portion in a longitudinal direction of the second wall in a cross section perpendicular to the rotation axis.

7. The rotation angle detection device according to claim 3, wherein the magnetism detection section is disposed apart from a center portion in a longitudinal direction of the second wall in a cross section perpendicular to the rotation axis.

8. The rotation angle detection device according to claim 1, wherein the rotation angle range of the magnetic field generation section is less than or equal to 180 degrees around the rotation axis, and the yoke has a sector shape in a cross section perpendicular to the rotation axis.

9. The rotation angle detection device according to claim 3, wherein the rotation angle range of the magnetic field generation section is 180 degrees around the rotation axis, the first wall has a semicircular arc shape in a cross section perpendicular to the rotation axis, the second wall has a first plate portion, a second plate portion, and a third plate portion, the first plate portion is parallel with a virtual line that connects the end portions of the first wall, the second plate portion is perpendicular to the first plate portion and is connected with one of the end portions of the first wall, and the third plate portion is perpendicular to the first plate portion and is connected with the other of the end portions of the first wall.

10. The rotation angle detection device according to claim 1, wherein the yoke has a quadrangular tube shape.

11. The rotation angle detection device according to claim 1, wherein the magnetic field generation section includes a magnetic body and a permanent magnet fixed to the magnetic body.

12. The rotation angle detection device according to claim 11, wherein the magnetic body extends from the rotation axis in a direction crossing the rotation axis, and the permanent magnet is fixed to a surface of the magnetic body facing the yoke.

13. The rotation angle detection device according to claim 1, wherein the magnetic force line passes through at least one of the two end portions of the yoke and enters a magnetism sensing surface of the magnetism detection section.

14. The rotation angle detection device according to claim 1, wherein the magnetic field strength in the gap is zero millitesla when the rotation angle of the rotating body is equal to zero degrees, and the magnetic field strength in the gap changes linearly corresponding to the rotation angle within a detection range of the rotation angle.

* * * * *